United States Patent
Lee et al.

(10) Patent No.: US 11,064,277 B2
(45) Date of Patent: Jul. 13, 2021

(54) DISPLAY APPARATUS

(71) Applicant: LG Display Co., Ltd., Seoul (KR)

(72) Inventors: JungHyun Lee, Paju-si (KR); SuYoung An, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 16/575,703

(22) Filed: Sep. 19, 2019

(65) Prior Publication Data

US 2020/0162804 A1    May 21, 2020

(30) Foreign Application Priority Data

Nov. 15, 2018  (KR) .......................... 10-2018-0140778

(51) Int. Cl.
*H04R 17/00* (2006.01)
*H04R 1/02* (2006.01)
*G02F 1/1333* (2006.01)

(52) U.S. Cl.
CPC ....... *H04R 1/028* (2013.01); *G02F 1/133308* (2013.01); *H04R 17/00* (2013.01); *H04R 2400/03* (2013.01); *H04R 2499/11* (2013.01); *H04R 2499/15* (2013.01)

(58) Field of Classification Search
CPC ... G02F 1/133308; G02F 2001/133314; G02F 2001/133317; H04R 17/00; H04R 1/028; H04R 2400/03; H04R 2499/11; H04R 2499/15
USPC .......................................................... 381/333
See application file for complete search history.

(56) References Cited

U.S. PATENT DOCUMENTS

| | | |
|---|---|---|
| 2005/0025330 A1 | 2/2005 | Saiki et al. |
| 2006/0010403 A1 | 1/2006 | Jeon |
| 2015/0078604 A1 | 3/2015 | Seo et al. |
| 2015/0341714 A1* | 11/2015 | Ahn .................. G06F 1/1688 381/333 |

(Continued)

FOREIGN PATENT DOCUMENTS

| | | |
|---|---|---|
| CN | 1581891 A | 2/2005 |
| CN | 1717118 A | 1/2006 |
| CN | 201360305 Y | 12/2009 |

(Continued)

OTHER PUBLICATIONS

Office Action dated May 6, 2021, issued in corresponding Chinese Patent Application No. 201910904874.2.

*Primary Examiner* — Vivian C Chin
*Assistant Examiner* — Friedrich Fahnert
(74) *Attorney, Agent, or Firm* — Morgan, Lewis & Bockius LLP

(57) ABSTRACT

Disclosed is a display apparatus for transferring an accurate sound. The display apparatus includes a display module including a display panel configured to display an image, a panel guide configured to support a rear periphery portion of the display panel, a rear cover configured to support the panel guide and to cover a rear surface of the display module, a first vibration generating module in a first portion of the rear cover, the first vibration generating module being configured to vibrate a center portion of the display panel, and a second vibration generating module in a second portion of the rear cover, the second vibration generating module being configured to vibrate a periphery portion of the display panel.

25 Claims, 3 Drawing Sheets

(56) References Cited

U.S. PATENT DOCUMENTS

2018/0317011 A1   11/2018   Choi et al.

FOREIGN PATENT DOCUMENTS

| CN | 103888561 A | 6/2014 |
| CN | 104461115 A | 3/2015 |
| CN | 107454512 A | 12/2017 |
| CN | 108810760 A | 11/2018 |
| CN | 108810765 A | 11/2018 |

* cited by examiner

DISPLAY APPARATUS

CROSS-REFERENCE TO RELATED APPLICATIONS

This application claims the benefit of and priority to Korean Patent Application No. 10-2018-0140778, filed on Nov. 15, 2018, the entirety of which is hereby incorporated by reference.

BACKGROUND

Technical Field

The present disclosure relates to a display apparatus including a display panel that outputs sound.

Discussion of the Related Art

Generally, display apparatuses are equipped in home appliances or electronic devices, such as televisions (TVs), monitors, notebook computers, smartphones, tablet computers, electronic organizers, electronic pads, wearable devices, watch phones, portable information devices, navigation devices, and automotive control display apparatuses, and are used as a screen for displaying an image.

General display apparatuses include a display panel for displaying an image and a sound device for outputting a sound associated with the image.

However, in general display apparatuses, since a sound output from a sound device travels toward a rearward region behind or a downward region under a display panel, sound quality is degraded due to interference between sounds reflected from a wall and the ground, and for this reason, it is difficult to transfer an accurate sound and an immersion experience of a viewer is reduced.

SUMMARY

Accordingly, embodiments of the present disclosure are directed to a display apparatus that substantially obviates one or more of issues due to limitations and disadvantages of the related art.

An aspect of the present disclosure is to provide a display apparatus for transferring an accurate sound.

Another aspect of the present disclosure is to provide a display apparatus having improved sound quality and increasing an immersion experience of a viewer.

Additional features and aspects will be set forth in the description that follows, and in part will be apparent from the description, or may be learned by practice of the inventive concepts provided herein. Other features and aspects of the inventive concepts may be realized and attained by the structure particularly pointed out in the written description, or derivable therefrom, and the claims hereof as well as the appended drawings.

To achieve these and other aspects of the inventive concepts, as embodied and broadly described, a display apparatus comprises a display module including a display panel configured to display an image, a panel guide configured to support a rear periphery portion of the display panel, a rear cover configured to support the panel guide and to cover a rear surface of the display module, a first vibration generating module in a first portion of the rear cover, the first vibration generating module being configured to vibrate a center portion of the display panel, and a second vibration generating module in a second portion of the rear cover, the second vibration generating module being configured to vibrate a periphery portion of the display panel.

In another aspect, a display apparatus comprises a display module including a display panel configured to display an image, a panel guide configured to support a rear periphery portion of the display panel, a rear cover configured to support the panel guide and to cover a rear surface of the display module, a first vibration generating module in a first portion of the rear cover, the first vibration generating module being configured to generate sound of a first sound band in a center portion of the display panel, and a second vibration generating module in a second portion of the rear cover, the second vibration generating module being configured to generate sound of a second sound band differing from the first sound band in a periphery portion of the display panel.

In another aspect, a display apparatus comprises a display module including a display panel configured to display an image, a panel guide configured to support a rear periphery portion of the display panel, a rear cover configured to support the panel guide and including a first portion overlapping a center portion, other than a periphery portion, of the display panel and a second portion overlapping the panel guide, a first vibration generating module in the first portion of the rear cover, the first vibration generating module being configured to generate a sound pressure between the center portion of the display panel and the first portion of the rear cover, and a second vibration generating module in the second portion of the rear cover, the second vibration generating module being configured to provide a sound vibration to the periphery portion of the display panel through the second portion of the rear cover.

The present disclosure may provide a display apparatus for transferring an accurate sound, and moreover, may provide a display apparatus for providing improved sound quality and increasing an immersion experience of a viewer.

The objects of the present disclosure are not limited to the aforesaid, but other objects not described herein will be clearly understood by those skilled in the art from descriptions below.

Other systems, methods, features and advantages will be, or will become, apparent to one with skill in the art upon examination of the following figures and detailed description. It is intended that all such additional systems, methods, features and advantages be included within this description, be within the scope of the present disclosure, and be protected by the following claims. Nothing in this section should be taken as a limitation on those claims. Further aspects and advantages are discussed below in conjunction with embodiments of the disclosure. It is to be understood that both the foregoing general description and the following detailed description of the present disclosure are examples and explanatory and are intended to provide further explanation of the disclosure as claimed.

BRIEF DESCRIPTION OF THE DRAWINGS

The accompanying drawings, that may be included to provide a further understanding of the disclosure and are incorporated in and constitute a part of this disclosure, illustrate embodiments of the disclosure and together with the description serve to explain various principles of the disclosure.

DETAILED DESCRIPTION

Figure 1:
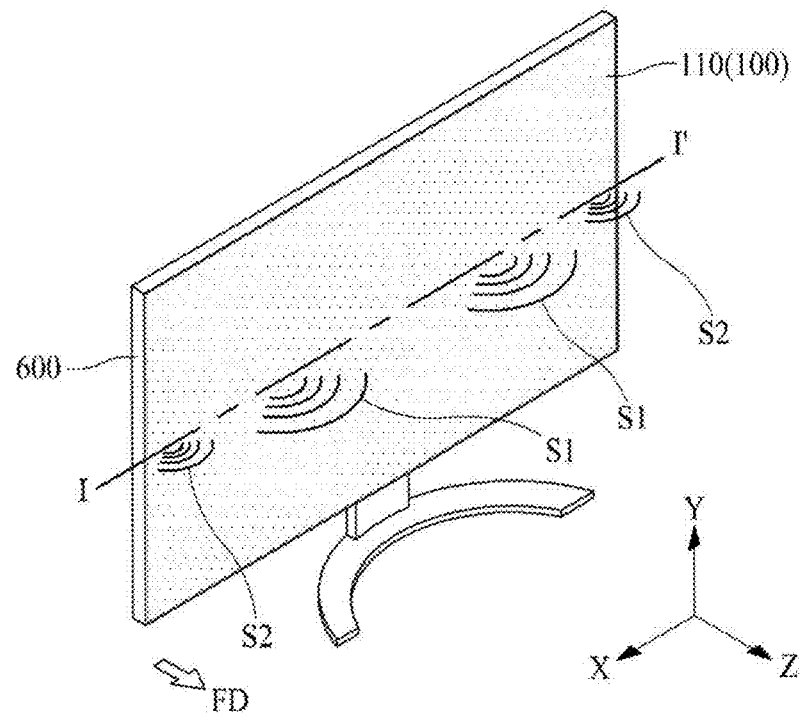
FIG. 1 illustrates a display apparatus according to an embodiment of the present disclosure.

Reference will now be made in detail to embodiments of the present disclosure, examples of which may be illustrated in the accompanying drawings. In the following description, when a detailed description of well-known functions or configurations related to this document is determined to unnecessarily cloud a gist of the inventive concept, the detailed description thereof will be omitted. The progression of processing steps and/or operations described is an example; however, the sequence of steps and/or operations is not limited to that set forth herein and may be changed as is known in the art, with the exception of steps and/or operations necessarily occurring in a particular order. Like reference numerals designate like elements throughout. Names of the respective elements used in the following explanations are selected only for convenience of writing the specification and may be thus different from those used in actual products.

Advantages and features of the present disclosure, and implementation methods thereof will be clarified through following embodiments described with reference to the accompanying drawings. The present disclosure may, however, be embodied in different forms and should not be construed as limited to the embodiments set forth herein. Rather, these embodiments are provided so that this disclosure may be sufficiently thorough and complete to assist those skilled in the art fully understand the scope of the present disclosure. Furthermore, the present disclosure is only defined by scopes of claims.

A shape, a size, a ratio, an angle, and a number disclosed in the drawings for describing embodiments of the present disclosure are merely an example. Thus, the present disclosure is not limited to the illustrated details. Like reference numerals refer to like elements throughout. In the following description, when the detailed description of the relevant known technology is determined to unnecessarily obscure the important point of the present disclosure, the detailed description of such known function or configuration may be omitted.

When "comprise," "have," and "include" described in the present disclosure are used, another part may be added unless a more limiting term, such as "only" is used. The terms of a singular form may include plural forms unless referred to the contrary.

In construing an element, the element is construed as including an error or tolerance range even where no explicit description of such an error or tolerance range.

In describing a position relationship, when a position relation between two parts is described as, for example, "on," "over," "under," or "next," one or more other parts may be disposed between the two parts unless a more limiting term, such as "just" or "direct(ly)" is used.

In describing a time relationship, when the temporal order is described as, for example, "after," "subsequent," "next," or "before," a case which is not continuous may be included unless a more limiting term, such as "just," "immediate(ly)," or "direct(ly)," is used.

It will be understood that, although the terms "first," "second," etc. may be used herein to describe various elements, these elements should not be limited by these terms. These terms are only used to distinguish one element from another. For example, a first element could be termed a second element, and, similarly, a second element could be termed a first element, without departing from the scope of the present disclosure.

In describing elements of the present disclosure, the terms such as "first," "second," "A," "B," "(a)," "(b)," may be used. These terms are merely for differentiating one element from another element, and the essence, sequence, order, or number of a corresponding element should not be limited by the terms. Also, when an element or layer is described as being "connected," "coupled," or "adhered" to another element or layer, the element or layer can not only be directly connected or adhered to that other element or layer, but also be indirectly connected or adhered to the other element or layer with one or more intervening elements or layers "disposed" between the elements or layers, unless otherwise specified.

The term "at least one" should be understood as including any and all combinations of one or more of the associated listed items. For example, the meaning of "at least one of a first item, a second item, and a third item" denotes the combination of all items proposed from two or more of the first item, the second item, and the third item as well as the first item, the second item, or the third item.

In the description of embodiments, when a structure is described as being positioned "on or above" or "under or below" another structure, this description should be construed as including a case in which the structures contact each other as well as a case in which a third structure is disposed therebetween. The size and thickness of each element shown in the drawings are given merely for the convenience of description, and embodiments of the present disclosure are not limited thereto, unless otherwise specified.

Features of various embodiments of the present disclosure may be partially or overall coupled to or combined with each other, and may be variously inter-operated with each other and driven technically as those skilled in the art can sufficiently understand. The embodiments of the present disclosure may be carried out independently from each other, or may be carried out together in co-dependent relationship.

Hereinafter, a display apparatus according to an embodiment of the present disclosure will be described in detail with reference to the accompanying drawings. In the specification, in adding reference numerals for elements in each drawing, it should be noted that like reference numerals already used to denote like elements in other drawings are used for elements wherever possible.

Figure 2:
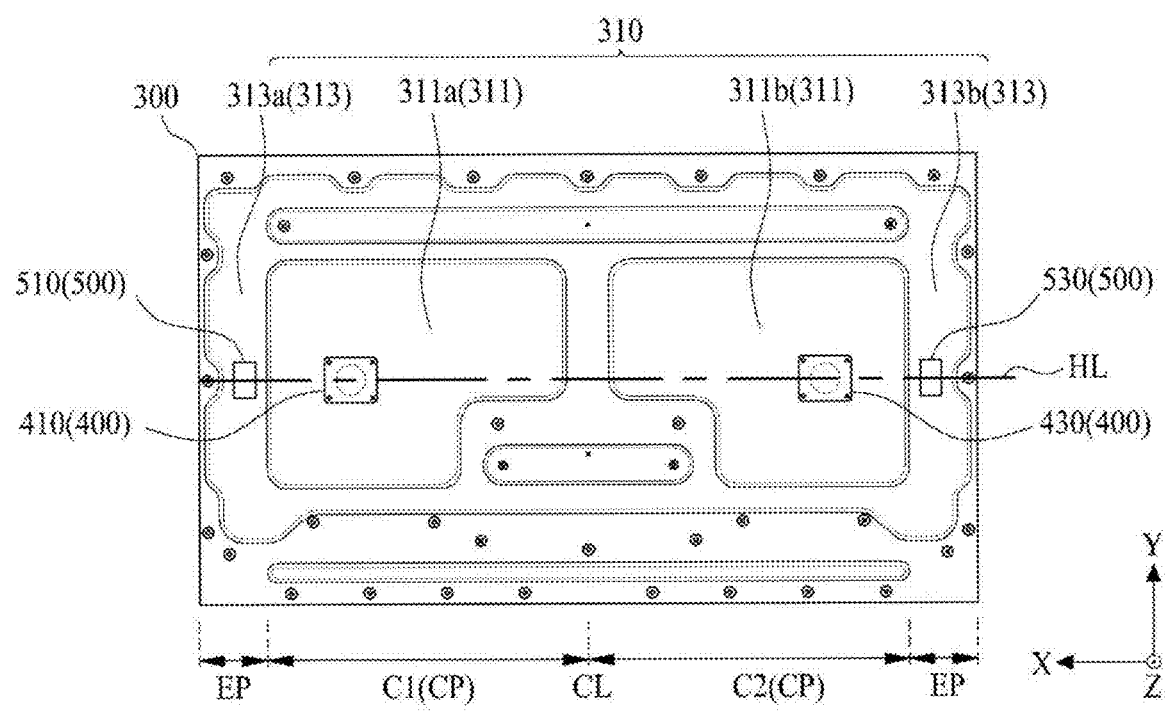
FIG. 2 illustrates is a rear surface of a display module illustrated in FIG. 1.
Figure 3:
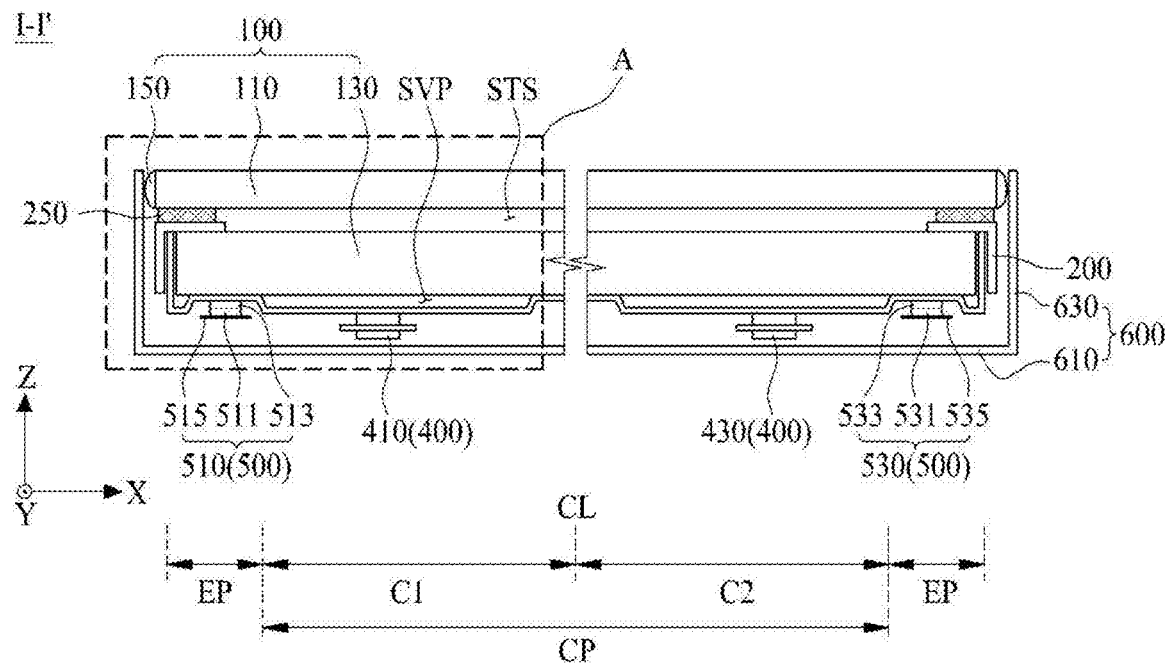
FIG. 3 is a cross-sectional view taken along line I-I' illustrated in FIG. 1.
Figure 4:
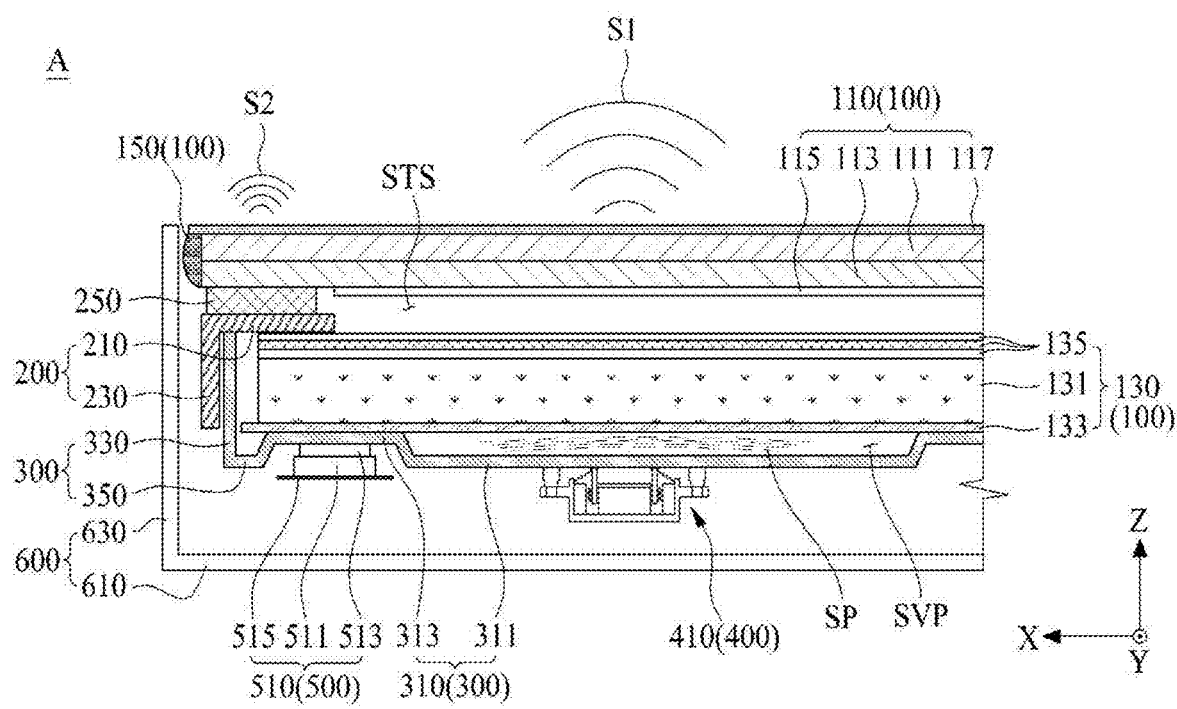
FIG. 4 is an enlarged view of a portion 'A' illustrated in FIG. 3.

FIG. 1 illustrates a display apparatus according to an embodiment of the present disclosure. FIG. 2 illustrates a rear surface of a display module illustrated in FIG. 1. FIG. 3 is a cross-sectional view taken along line I-I' illustrated in FIG. 1. FIG. 4 is an enlarged view of a portion 'A' illustrated in FIG. 3.

With reference to FIGS. 1 to 4, the display apparatus according to an embodiment of the present disclosure may include a display module 100, a panel guide 200, a rear cover 300, a first vibration generating module 400, and a second vibration generating module 500.

The display panel 110 may be a liquid crystal display module, but is not limited thereto and may be a display module such as a light emitting display module, an electrophoresis display module, a micro light emitting diode display module, an electro wetting display module, or a quantum dot light emitting display module.

The display module 100 according to an embodiment of the present disclosure may include a display panel 110 and a backlight 130.

The display panel 110 may display an image using light irradiated from the backlight 130. Also, the display panel 110 may act as a vibration plate that may vibrate based on vibrations of the first and second vibration generating modules 400 and 500 in a plate shape to output sound to a forward region FD in front of the display panel 110. For example, the display panel 110 may simultaneously or sequentially output sound S1 of a first sound band based on the vibration of the first vibration generating module 400 and sound S2 of a second sound band based on the vibration of the second vibration generating module 500 toward the forward region FD, wherein the first sound band may differ from the second sound band. Here, the sound S1 of the first sound band may be output from a center portion CP of the display panel 110 to the forward region FD, and the sound S2 of the second sound band higher than the sound S1 of the first sound band may be output from a periphery portion EP of the display panel 110 to the forward region FD.

The display panel 110 may include an upper substrate 111, a lower substrate 113, a lower polarization member 115, and an upper polarization member 117.

The upper substrate 111, a thin film transistor (TFT) array substrate, may include a pixel array including a plurality of pixels respectively in a plurality of pixel areas by intersections of a plurality of gate lines and a plurality of data lines. Each of the plurality of pixels may include a TFT connected to a gate line and a data line corresponding thereto, a pixel electrode connected to the TFT, and a common electrode which is provided adjacent to the pixel electrode and is supplied with a common voltage.

The upper substrate 111 may further include a pad part in a first periphery portion thereof and a gate driving circuit in a second periphery portion thereof.

The pad part may provide the pixel array and the gate driving circuit with a signal supplied from an outside. For example, the pad part may include a plurality of data pads connected to the plurality of data lines through a plurality of data link lines and a plurality of gate input pads connected to the gate driving circuit via a gate control signal line. A first periphery portion of the upper substrate 111 including the pad part may protrude from a corresponding side surface of the first periphery portion of the lower substrate 113, and the pad part may be exposed in a rearward direction toward the rear cover 300. For example, the upper substrate 111 may have a size which is greater than that of the lower substrate 113.

The gate driving circuit may be embedded (or integrated) into the second periphery portion of the upper substrate 111 so as to be connected to the plurality of gate lines in a one-to-one relationship. For example, the gate driving circuit may be a shift register including a transistor which is formed through the same process as a process of forming a TFT provided in each of the pixel areas. As another example, the gate driving circuit may be in the panel driving circuit without being embedded into the upper substrate 111.

The lower substrate 113, a color filter array substrate, may include a pixel defining pattern which defines an opening area overlapping each of the pixel areas provided on the upper substrate 111 and a color filter layer in the opening area. The lower substrate 113 may have a size which is less than that of the upper substrate 111. For example, the lower substrate 113 may overlap a portion other than the first periphery portion of the upper substrate 111. The lower substrate 113 may be attached to the upper substrate 111 with a liquid crystal layer therebetween using a sealant.

The liquid crystal layer may be between the upper substrate 111 and the lower substrate 113 and may include a liquid crystal including liquid crystal molecules having an alignment direction which is changed based on an electric field generated from the common voltage and a data voltage applied to the pixel electrode in each of the plurality of pixels.

The lower polarization member 115 may be on a lower surface of the lower substrate 113 and may polarize light which is irradiated from the backlight 130 and travels to the liquid crystal layer.

The upper polarization member 117 may be on an upper surface of the upper substrate 111 and may polarize light which passes through the upper substrate 111 and is output to the outside.

The display panel 110 according to an embodiment of the present disclosure may drive the liquid crystal layer according to the electric field generated from the common voltage and the data voltage applied to the pixel electrode in each of the plurality of pixels, thereby displaying an image using light passing through the liquid crystal layer. For example, since the upper substrate 111 which is the TFT array substrate configures an image display surface, a whole front surface of the display panel 110 according to an embodiment of the present disclosure may be externally exposed without being covered by a separate mechanism.

According to another embodiment of the present disclosure, in the display panel 110, the upper substrate 111 may be the color filter array substrate, and the lower substrate 113 may be the TFT array substrate. For example, the display panel 110 according to another embodiment of the present disclosure may have a type where an upper portion and a lower portion of the display panel 110 according to an embodiment of the present disclosure are reversed therebetween. In this case, a pad part of the display panel 110 according to another embodiment of the present disclosure may be covered by a separate mechanism.

The display module 100 according to an embodiment of the present disclosure may further include a sealing member 150.

The sealing member 150 may surround side surfaces of the display panel 110. The sealing member 150 may cover each side surface and each corner of the display panel 110. The sealing member 150 may protect the side surfaces of the display panel 110 from an external impact, or may prevent light from being leaked through the side surfaces of the display panel 110. The sealing member 150 according to an embodiment of the present disclosure may include a silicon-based sealant or ultraviolet (UV)-curable sealant (or resin), but considering a process tact time, the sealing member 150 may include the UV-curable sealant. Also, the sealing member 150 according to an embodiment of the present disclosure may have color (for example, blue, red, bluish green, or black), but is not limited thereto and may include a colored resin or a light blocking resin for preventing leakage of light through a side surface.

A portion of an upper surface of the sealing member 150 according to an embodiment of the present disclosure may be covered by the upper polarization member 117. For example, the upper polarization member 170 may include an extension portion which extends long from an outer surface of the upper substrate 111 to cover a portion of a front surface of the sealing member 150 and is attached to a portion of the front surface of the sealing member 150.

Therefore, a bonding surface (or a boundary portion) between the sealing member 150 and the upper substrate 111 may be concealed by the extension portion of the upper polarization member 170 and may not be exposed at a forward region, at which a viewer is located, in front of the display apparatus. In other words, the front surface of the display panel 110 may be exposed at the forward region FD in front of the display apparatus without being by a separate mechanism, and in a case where the sealing member 150 is not provided, leakage of light through the side surfaces of the display panel 110 may be prevented. Accordingly, the sealing member 150 may be an element necessarily needed for the display apparatus having a structure where the whole front surface of the display panel 110 is exposed at the forward region FD, for removing or minimizing a bezel width of the display apparatus.

The backlight 130 may be on a rear surface of the display panel 110 and may irradiate light onto the rear surface of the display panel 110.

The backlight 130 according to an embodiment of the present disclosure may include a light guide plate 131, a light source, a reflective sheet 133, and an optical sheet part 135.

The light guide plate 131 may include a light incident surface which is disposed to overlap the display panel 110 and is provided on one sidewall thereof. The light guide plate 131 may include a light-transmitting plastic or glass material. The light guide plate 131 may transfer (or output) light, which is incident through the light incident surface from the light source, to the display panel 110.

The light source may irradiate light onto the light incident surface provided in the light guide plate 131. The light source according to an embodiment of the present disclosure may include a plurality of light emitting diodes (LEDs) which are mounted on a light source printed circuit board (PCB) and irradiate lights onto the light incident surface of the light guide plate 131. The light source may be disposed in the rear cover 300 to overlap the first periphery portion of the display panel 110.

The reflective sheet 133 may cover a rear surface of the light guide plate 131. The reflective sheet 133 may reflect light, which is incident from the light guide plate 131, toward the light guide plate 131 to minimize the loss of the light.

The optical sheet part 135 may be on a front surface of the light guide plate 131 and may enhance a luminance characteristic of light output from the light guide plate 131. The optical sheet part 135 according to an embodiment of the present disclosure may include a lower diffusive sheet, a lower prism sheet, and an upper prism sheet, but is not limited thereto. In other embodiments, the optical sheet part 135 may be configured by a stacked combination of one or more sheets among a diffusive sheet, a prism sheet, a dual brightness enhancement film (DBEF), and a lenticular sheet, or may be configured with one composite sheet having a light diffusing function and a light collecting function.

The panel guide 200 may support a rear periphery portion of the display panel 110. The panel guide 200 may be supported by or accommodated into the rear cover 300 to overlap a rear periphery portion EP of the display panel 110. The panel guide 200 may be disposed under the rear periphery portion EP of the display panel 110 not to protrude to the outside of each side surface of the display panel 110.

The panel guide 200 according to an embodiment of the present disclosure may include a panel supporting part 210 and a guide sidewall 230. For example, the panel guide 200 may have a cross-sectional structure having a "¬-shape" or a "Γ-shape," based on a coupling or connection structure of the panel supporting part 210 and the guide sidewall 230.

The panel supporting part 210 may be coupled to (or connected to) the rear periphery portion EP of the display panel 110, and may be supported by the rear cover 300. For example, the panel supporting part 210 may have a tetragonal band shape including an opening overlapping the center portion CP, other than the rear periphery portion EP, of the display panel 110, but is not limited thereto. The panel supporting part 210 may have a size equal to or less than that of the display panel 110 not to protrude to the outside of each side surface of the display panel 110.

The panel supporting part 210 may directly contact an uppermost surface of the backlight 130 (for example, an uppermost surface of the optical sheet part 135), or may be spaced apart from the uppermost surface of the optical sheet part 135 by a certain distance.

The guide sidewall 230 may be connected to the panel supporting part 210, and may surround side surfaces of the rear cover 300. For example, the guide sidewall 230 may be bent from the panel supporting part 210 to the side surfaces of the rear cover 300, and may surround the side surfaces of the rear cover 300.

The panel guide 200 according to an embodiment of the present disclosure may include a plastic material, a metal material, or a mixed material of a plastic material and a metal material. For example, the panel guide 200 may also transfer a sound vibration, generated by the second vibration generating module 500, to a periphery portion of the display panel 110, and thus, may include a metal material for maintaining stiffness of the display panel 110 and transferring the sound vibration, generated by the second vibration generating module 500, to the display panel 110 without being lost of the sound vibration.

The panel guide 200 according to an embodiment of the present disclosure may be coupled to (or connected to) the rear periphery portion EP of the display panel 110 by a panel coupling member 250.

The panel coupling or connection member 250 may be between the rear periphery portion EP of the display panel 110 and the panel supporting part 210 of the panel guide 200 and may attach (or connect) the display panel 110 to the panel guide 200. The panel coupling member 250 may include an acryl-based adhesive member or a urethane-based adhesive member. For example, the panel coupling member 250 may include the urethane-based adhesive member which is relatively better in adhesive force and hardness than the acryl-based adhesive member, so that a vibration of the panel guide 200 is well transferred to the display panel 110. For example, the panel coupling member 250 may include an acryl-based adhesive layer, a double-sided foam adhesive pad, or an acryl-based adhesive resin curing layer.

A front surface of the panel coupling member 250 according to an embodiment of the present disclosure may be coupled to (or connected to) the lower substrate 113 or the lower polarization member 115 of the display panel 110, and for example, may be directly coupled to (or connected to) a rear periphery portion of the lower substrate 113 so as to enhance an adhesive force to the display panel 110. For example, the panel coupling member 250 may be attached (or connected) to the rear periphery portion of the lower substrate 113 and may surround a side surface of the lower polarization member 115, thereby preventing side light leakage from occurring in the lower polarization member 115.

The panel coupling member 250 may provide a sound transfer space STS between the display panel 110 and the panel guide 200 to have a certain thickness (or height). The panel coupling member 250 according to an embodiment of the present disclosure may be provided in a four-side-closed shape or a closed loop shape in the panel supporting part 210 of the panel guide 200. For example, the panel coupling member 250 may provide the closed sound transfer space STS between a rearmost surface of the display panel 110 and an uppermost surface of the backlight 130 which face each other with the opening of the panel guide 200 therebetween, thereby preventing or minimizing the leakage (or loss) of a sound pressure transferred to the sound transfer space STS. The sound transfer space STS may also act as a sound generating space where a sound pressure is generated based on a vibration of the backlight 130 or a panel vibration space which enables a vibration of the display panel 110 to be smoothly performed.

The rear cover 300 may support the panel guide 200 and may cover a rear surface of the display module 100. Also, the rear cover 300 may support the first and second vibration generating modules 400 and 500. The rear cover 300 according to an embodiment of the present disclosure may also act as a vibration plate, and thus, may include a metal material or a metal alloy material. For example, the rear cover 300 may include one material of an Al material, a Mg alloy material, a Mg—Li alloy material, and an Al alloy material.

The rear cover 300 according to an embodiment of the present disclosure may include a first portion overlapping the center portion CP of the display panel 110 and a second portion overlapping the periphery portion of the display panel 110.

The first portion of the rear cover 300 may be spaced apart from the rear surface of the display module 100. For example, the first portion of the rear cover 300 may be spaced apart from a rear surface of the reflective sheet 133 by a certain distance. The first portion of the rear cover 300 may be a protrusion portion spaced apart from the rear surface of the display module 100.

Since the first portion of the rear cover 300 is spaced apart from the rear surface of the display module 100, a sound pressure generator SVP may be provided between the first portion of the rear cover 300 and the rear surface of the display module 100. The sound pressure generator SVP may be a region where a sound pressure SP is generated based on a vibration of the rear cover 300 caused by the first vibration generating module 400 and may be referred to as a "sound box," a "sound part," a "resonance box," or a "resonance part," but the term is not limited thereto.

The second portion of the rear cover 300 may contact the rear surface of the display module 100. For example, the second portion of the rear cover 300 may directly contact the rear surface of the reflective sheet 133. The second portion of the rear cover 300 may be a flat portion contacting the rear surface of the display module 100.

The rear cover 300 according to an embodiment of the present disclosure may include a rear cover part 310 including the first portion and the second portion and a side cover part 330 which is disposed in a periphery of the rear cover part 310 and supports the panel guide 200.

The rear cover part 310 may accommodate the backlight 130, and may cover a rear surface of the backlight 130, thereby supporting the reflective sheet 133 of the backlight 130.

The rear cover part 310 according to an embodiment of the present disclosure may include a first rear cover part 311 which overlaps the center portion CP of the display panel 110 and protrudes toward the rear surface of the display panel 110 and a second rear cover part 313 which overlaps the periphery portion EP of the display panel 110.

The first rear cover part 311 may include first and second rear protrusion portions 311a and 311b.

The first rear protrusion portion 311a may protrude toward the rear surface of the display panel 110 to overlap a left region C1 of the center portion CP of the display panel 110. The first rear protrusion portion 311a may protrude to have an inclined surface from the rear cover part 310 having a plate shape. The first rear protrusion portion 311a according to an embodiment of the present disclosure may be provided in a left region of the first rear cover part 311 with respect to a center portion CL, having a long-side length, of the rear cover 300 parallel to a first direction X.

The second rear protrusion portion 311b may protrude toward the rear surface of the display panel 110 to overlap a right region C2 of the center portion CP of the display panel 110. The second rear protrusion portion 311b may protrude to have an inclined surface from the rear cover part 310 having a plate shape. The second rear protrusion portion 311b according to an embodiment of the present disclosure may be provided in a right region of the first rear cover part 311 with respect to the center portion CL, having the long-side length, of the rear cover 300 parallel to the first direction X.

The first and second rear protrusion portions 311a and 311b may have a symmetrical structure therebetween with respect to the center portion CL, having the long-side length, of the rear cover 300, but is not limited thereto. Each of the first and second rear protrusion portions 311a and 311b may include a cross-sectional surface having a tetragonal truncated cone shape, a circular truncated cone shape, or a circular truncated cone shape, of which a cross-sectional area is progressively reduced in a protrusion direction, and may one-dimensionally have a polygonal shape, a circular shape, or an elliptical shape. Each of the first and second rear protrusion portions 311a and 311b may protrude to have an inclined surface and thus may increase stiffness of the rear cover 300, and moreover, may include a space spaced apart from the rear surface of the display module 100 and thus may act as a sound box which generates a sound pressure based on a vibration of the first vibration generating module 400.

The second rear cover part 313 may be a flat portion which is disposed in a periphery portion of the rear cover part 310 overlapping the periphery portion EP of the display panel 110. The second rear cover part 313 according to an embodiment of the present disclosure may include first and second portions 313a and 313b. The first portion 313a may be a first flat portion, and the second portion 313b may be a second flat portion.

The first portion 313a may overlap a left periphery portion of the periphery portion EP of the display panel 110. For example, the first portion 313a may be between the first rear protrusion portion 311a and the side cover part 330 with respect to the first direction X.

The second portion 313b may overlap a right periphery portion of the periphery portion EP of the display panel 110. For example, the second portion 313b may be between the second rear protrusion portion 311b and the side cover part 330 with respect to the first direction X.

The first and second portions 313a and 313b may contact the display module 100 (for example, the rear surface of the reflective sheet 133), and thus, may transfer a sound vibration, generated based on a vibration of the second vibration generating module 500, to the reflective sheet 133.

The side cover part 330 may be bent vertically from a periphery of the rear cover part 310 and may support the rear surface of the panel guide 200. The side cover part 330 may provide a backlight accommodating space in the rear cover part 310 and may surround side surfaces of the backlight 130 accommodated into (or supported by) the backlight accommodating space. The side cover part 330 may transfer a sound vibration, generated in the second rear cover part 313 by the second vibration generating module 500, to the panel guide 200.

As another example, the rear cover 300 according to an embodiment of the present disclosure may further include a reinforcement part 350.

The reinforcement part 350 (or a stiffness reinforcement part) may be disposed to surround the second rear cover part 313. The reinforcement part 350 according to an embodiment of the present disclosure may be disposed between the second rear cover part 313 and the side cover part 330. For example, the reinforcement part 350 may protrude toward the rear surface of the display panel 110 to have an inclined surface inclined from an end of the second rear cover part 313. When the rear cover 300 includes the reinforcement part 350, the side cover part 330 may be connected to the end portion of the reinforcement part 350.

The first vibration generating module 400 may be disposed in the first portion of the rear cover 300 and may vibrate the center portion CP of the display panel 110. The first vibration generating module 400 may generate a sound pressure SP between the center portion CP of the display panel 110 and the first rear cover part 311 of the rear cover 300. The first vibration generating module 400 may generate the sound S1 of the first sound band in the center portion CP of the display panel 110. The sound S1 of the first sound band may have a frequency of a low-pitched sound band. For example, the low-pitched sound band may be 200 Hz or less, but is not limited thereto.

The first vibration generating module 400 according to an embodiment of the present disclosure may be coupled to (or connected to) a rear surface of the first rear cover part 311 provided in the rear cover 300. In response to a sound signal input from the outside, the first vibration generating module 400 may vibrate the first rear cover part 311 to generate a sound pressure SP in the sound pressure generator SVP and may vibrate the center portion CP of the display panel 110 based on the sound pressure SP. The first vibration generating module 400 according to an embodiment of the present disclosure may include a sound actuator or a sound exciter.

The first vibration generating module 400 according to an embodiment of the present disclosure may include a first sound generator 410 installed (or disposed) in the first rear protrusion portion 311a of the first rear cover part 311 and a second sound generator 430 installed (or disposed) in the second rear protrusion portion 311b of the first rear cover part 311.

The first sound vibrator 410 may vibrate the first rear protrusion portion 311a in response to the sound signal to generate a sound pressure SP in the sound pressure generator SVP based on the vibration of the first rear protrusion portion 311a, thereby vibrating the left region C1 of the center portion CP of the display panel 110. For example, when the first sound generator 410 vibrates based on the sound signal, the sound pressure SP may be generated in the sound pressure generator SVP based on the vibration of the first rear protrusion portion 311a caused by the vibration of the first sound generator 410, a sound pressure may be generated in the sound transfer space STS based on a vibration of the backlight 130 based on the sound pressure SP generated in the sound pressure generator SVP, and the left region C1 of the center portion CP of the display panel 110 may vibrate based on the sound pressure generated in the sound transfer space STS, whereby the sound S1 of the first sound band may be output to the forward region FD in front of the display panel 110.

The first sound generator 410 according to an embodiment of the present disclosure may be disposed in a center portion of the first rear protrusion portion 311a acting as a sound box so that the sound S1 of the low-pitched sound band generated based on the vibration of the first rear protrusion portion 311a is directly transferred to a listener through air of the sound pressure generator SVP, but is not limited thereto. For example, a position of the first sound generator 410 in the first rear protrusion portion 311a may be set based on matching with a sound based on a vibration of the second sound generator 430 or realization of a stereo sound.

The second sound generator 430 may vibrate the second rear protrusion portion 311b in response to the sound signal to generate a sound pressure SP in the sound pressure generator SVP based on the vibration of the second rear protrusion portion 311b, thereby vibrating the right region C2 of the center portion CP of the display panel 110. For example, when the second sound generator 430 vibrates based on the sound signal, the sound pressure SP may be generated in the sound pressure generator SVP based on the vibration of the second rear protrusion portion 311b caused by the vibration of the second sound generator 430, a sound pressure may be generated in the sound transfer space STS based on a vibration of the backlight 130 based on the sound pressure SP generated in the sound pressure generator SVP, and the right region C2 of the center portion CP of the display panel 110 may vibrate based on the sound pressure generated in the sound transfer space STS, whereby the sound S1 of the first sound band may be output to the forward region FD in front of the display panel 110.

The second sound generator 430 according to an embodiment of the present disclosure may be disposed in a center portion of the second rear protrusion portion 311b acting as a sound box so that the sound S1 of the low-pitched sound band generated based on the vibration of the second rear protrusion portion 311b is directly transferred to the listener through air of the sound pressure generator SVP, but is not limited thereto. For example, a position of the second sound generator 430 disposed in the second rear protrusion portion 311b may be set based on matching with a sound based on a vibration of the first sound generator 410 or realization of a stereo sound. For example, arrangement positions of the first and second sound generators 410 and 430 may be symmetrical or asymmetrical with respect to the center portion CL, having the long-side length of the rear cover 300.

The second vibration generating module 500 may be in the second portion of the rear cover 300, and may vibrate the periphery portion EP of the display panel 110. The second vibration generating module 500 may generate a sound vibration in the periphery portion EP of the display panel 110. The second vibration generating module 500 may generate the sound S2 of the second sound band, which differs from the sound S1 of the first sound band generated in the center portion CP of the display panel 110, in the periphery portion EP of the display panel 110. The sound S2 of the second sound band may have a frequency of a middle-high-pitched sound band or a high-pitched sound band. The second vibration generating module 500 according to an embodiment of the present disclosure may include a piezoelectric element having a piezoelectric effect. For example, a middle-pitched sound band may be 200 Hz to 3 kHz and the high-pitched sound band may be 3 kHz or more, but embodiments are not limited thereto.

The second vibration generating module 500 according to an embodiment of the present disclosure may include a first piezoelectric vibrator 510 installed (or disposed) in the first portion 313a of the second rear cover part 313 in the rear cover 300 and a second piezoelectric vibrator 530 installed (or disposed) in the second portion 313b of the second rear cover part 313 in the rear cover 300.

In response to the sound signal, the first piezoelectric vibrator 510 may vibrate the flat portion 313a of the second rear cover part 313 to vibrate the periphery portion EP of the display panel 110 based on the vibration of the first portion 313a. For example, when the first piezoelectric vibrator 510 vibrates based on the sound signal, a sound vibration of the first portion 313a based on the vibration of the first piezoelectric vibrator 510 may be transferred to the periphery portion EP of the display panel 110 through the panel guide 200, and the periphery portion EP of the display panel 110 may vibrate based on the sound vibration transferred through the panel guide 200, whereby the sound S2 of the second sound band may be output to the forward region FD in front of the display panel 110.

The first piezoelectric vibrator 510 according to an embodiment of the present disclosure may be in the second rear cover part 313 close to the side cover part 330 of the rear cover 300 so that a sound S2 of the high-pitched sound band generated based on a sound vibration of the periphery portion EP of the display panel 110 caused by a sound vibration of the first portion 313a is directly transferred to the listener. For example, the first piezoelectric vibrator 510 may be in the second rear cover part 313 to overlap the panel supporting part 210 of the panel guide 200 that supports a periphery portion of the periphery portion EP of the display panel 110.

The first piezoelectric vibrator 510 according to an embodiment of the present disclosure may be in a center portion of the second rear cover part 313 with respect to a lengthwise direction of the second rear cover part 313 parallel to a second direction Y. In this case, the first sound generator 410 of the first vibration generating module 400 according to an embodiment of the present disclosure may be on the same line as the first piezoelectric vibrator 510 with respect to the first direction X, or may be disposed on or under a horizontal line HL parallel to the first direction X. For example, a center portion of the first sound generator 410 may be on the horizontal line HL which extends from the center portion of the first piezoelectric vibrator 510 in parallel with the first direction X. As another example, the center portion of the first sound generator 410 may be disposed under or on the horizontal line HL with respect to the second direction Y. In this case, the center portion of the first sound generator 410 may be disposed under rather than on the horizontal line HL with respect to the second direction Y so that a sound S1 of the low-pitched sound band generated based on a vibration of the left region C1 of the center portion CP of the display panel 110 is directly transferred to the listener.

The first piezoelectric vibrator 510 according to an embodiment of the present disclosure may include a first piezoelectric element 511 attached to the first portion 313a of the second rear cover part 313 by a first adhesive member 513.

The first piezoelectric element 511 may include a piezoelectric material layer having a piezoelectric effect.

The piezoelectric material layer may include a piezoelectric material that vibrates with an electric field. The piezoelectric material may have a characteristic in which as pressure is applied to, or twisting occurs in, a crystalline structure due to an external force, a potential difference is caused by dielectric polarization based on a relative position change of a positive (+) ion and a negative (−) ion, and vibration occurs due to an electric field based on an applied voltage.

The piezoelectric material layer according to an embodiment of the present disclosure may include a polymer material-containing piezoelectric material, a thin film material-containing piezoelectric material, a composite material-containing piezoelectric material, or a single crystalline ceramic or polycrystalline ceramic-containing piezoelectric material. Examples of the polymer material-containing piezoelectric material may include polyvinylidene fluoride (PVDF), polyvinylidene fluoride trifluoroethylene P(VDF-TrFe), and polyvinylidene fluoride-tetrafluoroethylene P(VDFTeFE). Examples of the thin film material-containing piezoelectric material may include ZnO, CdS, and AlN. Examples of the composite material-containing piezoelectric material may include PZT-PVDF, PZT-silicon rubber, PZT-epoxy, PZT-foam polymer, and PZT-foam urethane. Examples of the single crystalline ceramic-containing piezoelectric material may include $\alpha$-AlPO$_4$, $\alpha$-SiO$_2$, LiNbO$_3$, Tb$_2$(MoO$_4$)$_3$, Li$_2$B$_4$O$_7$, and ZnO. Examples of the polycrystalline ceramic-containing piezoelectric material may include a PZT-based material, a PT-based material, a PZT-complex Perovskite-based material, and BaTiO$_3$.

The first piezoelectric element 511 according to an embodiment of the present disclosure may have a first length parallel to the first direction X and a second length parallel to the second direction Y. For example, the first length of the first piezoelectric element 511 may be shorter than the second length, but is not limited thereto, and may be equal to or longer than the second length.

The first adhesive member 513 may include a double-sided tape or a naturally curable adhesive. The first adhesive member 513 may include a thermocurable adhesive or a photocurable adhesive. In an example, a characteristic of the first piezoelectric element 511 may be reduced by heat used in a curing process of curing the first adhesive member 513.

The first piezoelectric vibrator 510 according to an embodiment of the present disclosure may further include a first protection member 515 attached to a rear surface of the first piezoelectric element 511.

The first protection member 515 may have a size which is wider than the first piezoelectric element 511 and may be attached to the rear surface of the first piezoelectric element 511. The first protection member 515 may prevent the first piezoelectric element 511 from being damaged by a physical impact and/or an electrical impact such as static electricity. For example, the first piezoelectric element 511 may be damaged by static electricity which occurs in the display module 100 such as a panel driving circuit or flows in from the outside, or may be damaged by a physical contact with the display module 100 caused by pressing of the display module 100. Therefore, the first protection member 515 may be disposed between the display module 100 and the first piezoelectric element 511, and thus, may cut off static electricity transferred to the first piezoelectric element 511 through the display module 100 to protect the static electricity from the first piezoelectric element 511 and may protect the first piezoelectric element 511 from a physical impact applied to the first piezoelectric element 511. The first protection member 515 according to an embodiment of the present disclosure may include a single-sided insulation tape or an insulation single-sided foam tape each including an adhesive layer attached to the rear surface of the first piezoelectric element 511. For example, the first protection member 515 may be a polyethylene terephthalate (PET) insulation tape or a polyvinyl chloride (PVC) insulation tape.

In response to the sound signal, the second piezoelectric vibrator 530 may vibrate the second portion 313b of the second rear cover part 313 to vibrate the periphery portion EP of the display panel 110 based on the vibration of the second portion 313b. For example, when the second piezoelectric vibrator 530 vibrates based on the sound signal, a sound vibration of the second portion 313b based on the vibration of the second piezoelectric vibrator 530 may be transferred to the periphery portion EP of the display panel 110 through the panel guide 200, and the periphery portion EP of the display panel 110 may vibrate based on the sound vibration transferred through the panel guide 200, whereby the sound S2 of the second sound band may be output to the forward region FD in front of the display panel 110.

The second piezoelectric vibrator 530 according to an embodiment of the present disclosure may be in the second rear cover part 313 close to the side cover part 330 of the rear cover 300 so that a sound S2 of the high-pitched sound band generated based on a sound vibration of the periphery portion EP of the display panel 110 caused by a sound vibration of the first portion 313a is directly transferred to the listener. For example, the second piezoelectric vibrator 530 may be in the second rear cover part 313 to overlap the panel supporting part 210 of the panel guide 200 that supports a right periphery portion of the periphery portion EP of the display panel 110.

The second piezoelectric vibrator 530 according to an embodiment of the present disclosure may be in a center portion of the second rear cover part 313 with respect to the lengthwise direction of the second rear cover part 313 parallel to a second direction Y. In this case, the second sound generator 430 of the first vibration generating module 400 according to an embodiment of the present disclosure may be on the same line as the second piezoelectric vibrator 530 with respect to the first direction X, or may be disposed on or under a horizontal line HL parallel to the first direction X. For example, a center portion of the second sound generator 430 may be on the horizontal line HL which extends from the center portion of the second piezoelectric vibrator 530 in parallel with the first direction X. As another example, the center portion of the second sound generator 430 may be under or on the horizontal line HL with respect to the second direction Y. In this case, the center portion of the second sound generator 430 may be under rather than on the horizontal line HL with respect to the second direction Y so that a sound S1 of the low-pitched sound band generated based on a vibration of the right region C2 of the center portion CP of the display panel 110 is directly transferred to the listener.

The second piezoelectric vibrator 530 according to an embodiment of the present disclosure may include a second piezoelectric element 531 attached to the second portion 313b of the second rear cover part 313 by a second adhesive member 533.

The second piezoelectric element 531 may include a piezoelectric material layer having the piezoelectric effect. The second piezoelectric element 531 may have substantially the same as a configuration (or a structure) of the first piezoelectric element 511, and thus, repetitive description may be omitted.

The second adhesive member 533 may include a double-sided tape or a naturally curable adhesive. The second adhesive member 533 may include a thermocurable adhesive or a photocurable adhesive, and for example, a characteristic of the second piezoelectric element 531 may be reduced by heat used in a curing process of curing the second adhesive member 533.

The second piezoelectric vibrator 530 according to an embodiment of the present disclosure with respect to the first direction X may further include a second protection member 535 attached to a rear surface of the second piezoelectric element 531.

The second protection member 535 may have a size which is wider than the second piezoelectric element 531 and may be attached to the rear surface of the second piezoelectric element 531. The second protection member 535 may prevent the second piezoelectric element 531 from being damaged by a physical impact and/or an electrical impact such as static electricity. The second protection member 535 may have substantially the same as a configuration (or a structure) of the first protection member 515, and thus, its repetitive description is omitted.

The display apparatus according to an embodiment of the present disclosure may further include a system rear cover 600.

The system rear cover 600 may accommodate the display module 100 coupled to (or connected to) the first and second vibration modules 400 and 500 and may surround the side surfaces of the display module 100. The system rear cover 600 according to an embodiment of the present disclosure with respect to the first direction X may include a rear structure 610 and a side structure 630.

The rear structure 610 may be an outermost rear mechanism disposed on a rear surface of the display apparatus. The rear structure 610 may support (or accommodate) the display module 100 and may cover the rear surface of the display module 100.

The side structure 630 may be an outermost side mechanism disposed on a side surface of the display apparatus and may be provided in a periphery of the rear structure 610 to cover the side surfaces of the display module 100.

Figure 5:
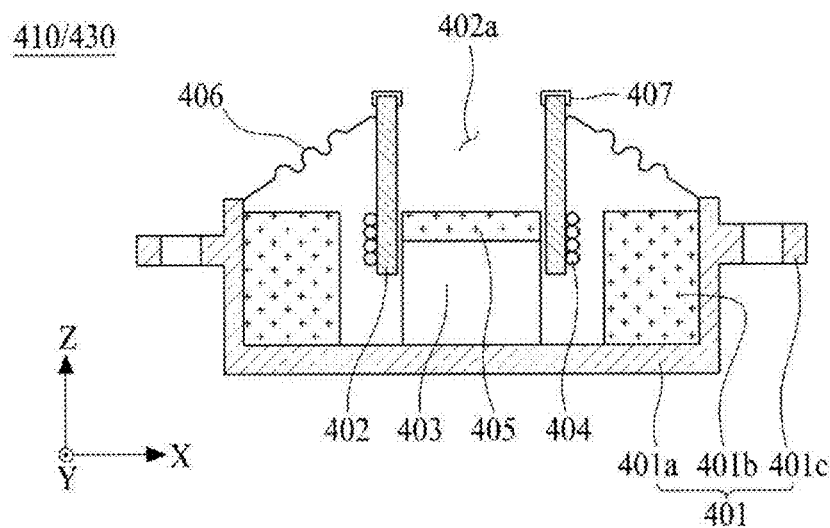
FIG. 5 illustrates first and second sound generators of a first vibration generating module illustrated in FIG. 3.

FIG. 5 illustrates the first and second sound generators of the first vibration generating module illustrated in FIG. 3.

With reference to FIGS. 2 to 5, the first and second sound generators 410 and 430 according to an embodiment of the present disclosure may include a module frame 401, a bobbin 402, a magnet member 403, a coil 404, a center pole 405, and a damper 406.

The module frame 401 may be supported by the first rear cover part 310 of the rear cover 300. For example, the module frame 401 of the first sound generator 410 may be supported by the first rear protrusion portion 311a of the rear cover 300, and the module frame 401 of the second sound generator 430 may be supported by the second rear protrusion portion 311b of the rear cover 300.

The module frame 401 according to an embodiment of the present disclosure may include a frame body 401a, an upper plate 401b, and a fixing bracket 401c.

The frame body 401a may be disposed to overlap the first rear cover part 310. The frame body 401a may act as a lower plate which supports the magnet member 403.

The upper plate 401b may protrude to a front periphery of the frame body 401a to have a cylindrical shape including a hollow portion. Therefore, the frame body 401a and the upper plate 401b may be provided as one body having a U-shape. The frame body 401*a* and the upper plate 401*b* are not limited to these terms and may each be referred to as a "yoke," etc.

The fixing bracket 401*c* may protrude from each of one side surface and the other side surface, which are parallel to each other, of the frame body 401*a*. The fixing bracket 401*c* may be fixed to the first rear cover part 310 of the rear cover 300 by a module fixing member, and thus, the module frame 401 may be fixed to the first rear cover part 310 of the rear cover 300.

The module fixing member may be a screw or a bolt which passes through the fixing bracket 401*c* and is fastened to the first rear cover part 310 of the rear cover 300. In this case, a buffering ring may be disposed between the first rear cover part 310 of the rear cover 300 and the fixing bracket 401*c*, and the buffering ring may prevent a vibration of the first rear cover part 310 from being transferred to the module frame 401.

The bobbin 402 may be on the module frame 401 and may vibrate the first rear cover part 310 of the rear cover 300. The bobbin 402 according to an embodiment of the present disclosure may have a cylindrical shape including the hollow portion 402*a* and may be coupled to (or connected to) a rear surface of the first rear cover part 310. For example, the bobbin 402 may include a cylindrical (or ring) structure including a material obtained by processing pulp or paper, Al or Mg or an alloy thereof, synthetic resin such as polypropylene, or a polyamide-based fiber. The bobbin 402 may vibrate based on a magnetic force, and for example, may perform a vertical reciprocating motion.

The magnet member 403 may be on the module frame 401 so as to be accommodated into the hollow portion 402*a* of the bobbin 402. The magnet member 403 may be a permanent magnet having a cylindrical shape so as to be inserted or accommodated into the hollow portion 402*a* of the bobbin 402. For example, the magnet member 403 may be implemented with a sintered magnet such as barium ferrite, and a material of the magnet member 403 may use $Fe_2O_3$, $BaCO_3$, a neodymium magnet, strontium ferrite with improved magnet component, an alloy cast magnet including aluminum (Al), nickel (Ni), and cobalt (Co), and/or the like, but is not limited thereto. For example, the neodymium magnet may be neodymium-iron-boron (Nd—Fe—B), but embodiments are not limited thereto.

The coil 404 may be wound to surround a lower outer circumference surface of the bobbin 402 and may be supplied with a sound signal (or a voice signal) from the outside. The coil 404 may be raised or lowered along with the bobbin 402. In this case, the coil 404 may be referred to as a "voice coil." When a sound signal (or a current) is applied to the coil 404, a whole portion of the bobbin 402 may vibrate (for example, may perform a vertical reciprocating motion) according to Fleming's Left-Hand Rule for Motors based on an application magnetic field generated around the coil 404 and an external magnetic field generated around the magnet member 403.

The center pole 405 may be on the magnet member 403 to guide a vibration of the bobbin 402. For example, the center pole 405 may be inserted or accommodated into the hollow portion of the bobbin 402 having a cylindrical shape and may be surrounded by the bobbin 402. Here, the center pole 405 may be referred to as an "elevation guider" or "pole pieces."

The damper 406 may be between the module frame 401 and the bobbin 402. For example, the damper 406 according to an embodiment of the present disclosure may be between the frame body 401*a* of the module frame 401 and an upper outer circumference surface of the bobbin 402. The damper 406 may be provided in a creased structure which is creased between one end and the other end thereof and may be contracted and relaxed based on a vibration of the bobbin 402. A vibration distance (or a vertical movement distance) of the bobbin 402 may be limited by a restoring force of the damper 406. For example, when the bobbin 402 vibrates by a certain distance or more or vibrates by a certain distance or less, the bobbin 402 may be restored to an original position by the restoring force of the damper 406. Also, the damper 406 may be referred to as a "spider," a "suspension," or an "edge," but is not limited thereto.

Each of the first and second sound generators 410 and 430 according to an embodiment of the present disclosure may be referred to as an internal magnetic type where the magnet member 403 is inserted or accommodated into the hollow portion of the bobbin 402.

As another example, each of the first and second sound generators 410 and 430 according to an embodiment of the present disclosure may be referred to as an external magnetic type (or a dynamic type) such that the magnet member 403 is disposed to surround an outer portion of the bobbin 402. For example, except for that the magnet member 403 is provided between the frame body 401*a* and the upper plate 401*a* and the center pole 405 is provided on the lower plate 401*a* so as to be inserted into the hollow portion of the bobbin 402, external type sound generators 410 and 430 may be the same as an internal type, and thus, their detailed descriptions may be omitted.

Each of the first and second sound generators 410 and 430 according to an embodiment of the present disclosure may further include a bobbin protection member 407 between an upper portion of the bobbin 402 and the first rear cover part 310 (or the first portion) of the rear cover 300.

The bobbin protection member 407 may be provided (or connected) to in a cylindrical structure including an opening overlapping the hollow portion 402*a* of the bobbin 402 and may be coupled or connected to an upper surface of the bobbin 402. The bobbin protection member 407 may cover the upper surface of the bobbin 402 to protect the bobbin 402, thereby preventing deformation of the bobbin 402 caused by an external impact.

The bobbin protection member 407 according to an embodiment of the present disclosure may be provided in a molding form of an injection material or metal. For example, the bobbin protection member 407 may include a textile reinforced material, a composite resin including a textile reinforced material, or metal, and for example, may have a heat dissipation function of dissipating heat occurring when the first and second sound generators 410 and 430 are being driven. The textile reinforced material may be one of carbon fiber reinforced plastics (CFRP), glass fiber reinforced plastics (GFRP), and graphite fiber reinforced plastics (GFRP), or a combination thereof, but is not limited thereto.

The bobbin protection member 407 according to an embodiment of the present disclosure may be coupled to (or connected to) the bobbin 402 by a double-sided tape or an adhesive resin. Here, the adhesive resin may be an epoxy resin or an acryl resin, but is not limited thereto.

The bobbin protection member 407 according to an embodiment of the present disclosure may be coupled or connected to the first rear cover part 310 of the rear cover 300 by a double-sided tape or an adhesive resin.

The display apparatus according to an embodiment of the present disclosure may output, to the forward region FD in front of the display panel 110, the sound S1 of the first sound band generated based on the vibration of the center portion CP of the display panel 110 caused by driving of the first vibration generating module 400 and the sound S2 of the second sound band generated based on the vibration of the periphery portion EP of the display panel 110 caused by driving of the second vibration generating module 500, and thus, may provide a more accurate sound to a listener, thereby enhancing immersion of the listener (or a viewer) due to harmony (or matching) between an image and a sound. Also, the display apparatus according to an embodiment of the present disclosure may output the sound S1 of the first sound band by using the first vibration generating module 400 having a voice coil type having a relatively good low-pitched sound output characteristic and may output the sound S2 of the second sound band by using the second vibration generating module 500 including a piezoelectric element having a piezoelectric effect and having a relatively good low-pitched sound output characteristic, thereby outputting sound of a broad sound band. Also, the display apparatus according to an embodiment of the present disclosure may have a stereo sound effect using a left sound based on the first sound generator 410 disposed in the first rear protrusion portion 311a of the rear cover 300 and a right sound based on the second sound generator 430 in the second rear protrusion portion 311b of the rear cover 300.

Figure 6:
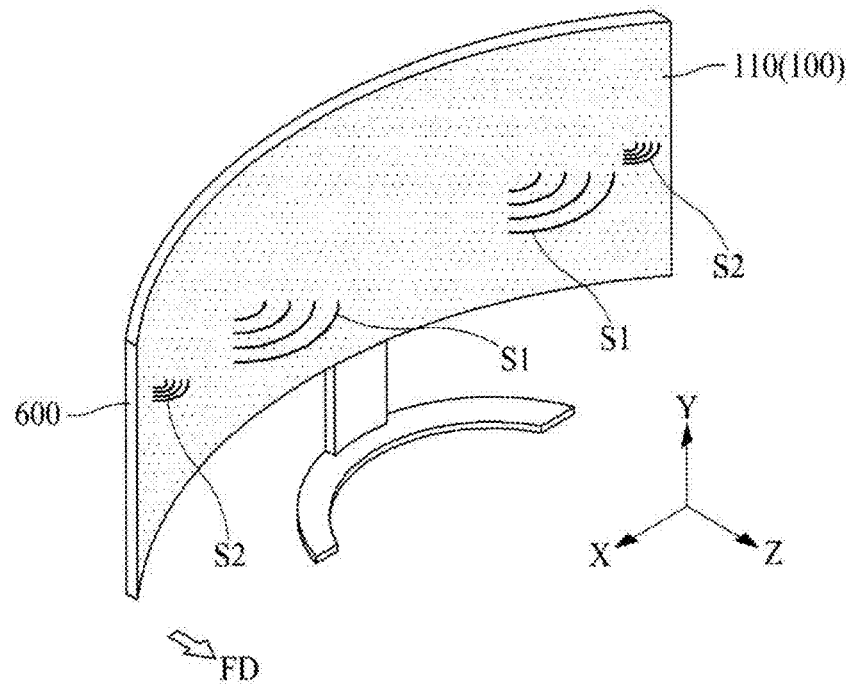
FIG. 6 illustrates a curved display apparatus according to an embodiment of the present disclosure.

The display apparatus illustrated in FIGS. 1 to 5 may be applied to the curved display apparatus illustrated in FIG. 6. For example, except for that the rear cover part of the rear cover is bent to have a curved shape, the rear cover of the curved display apparatus according to an embodiment of the present disclosure may be substantially the same as the rear cover of the display apparatus illustrated in FIGS. 1 to 5, and thus, its repetitive description is omitted. In the curved display apparatus, the display panel 110 of the display module 100 may be bent in a curved shape along a curved shape of the rear cover, may vibrate by the first vibration generating module to output the sound S1 of the first sound band to the forward region FD, and may vibrate by the second vibration generating module to output the sound S2 of the second sound band to the forward region FD, thereby increasing image immersion and sound immersion of a viewer.

A display apparatus according to an embodiment of the present disclosure may be applied to various applications that output sound based on a vibration of a display module without a separate speaker. A display apparatus according to an embodiment of the present disclosure may be applied to mobile apparatuses, video phones, smart watches, watch phones, wearable apparatuses, foldable apparatuses, rollable apparatuses, bendable apparatuses, flexible, curved apparatuses, portable multimedia players (PMPs), personal digital assistants (PDAs), electronic organizers, desktop personal computers (PCs), laptop PCs, netbook computers, workstations, navigation apparatuses, automotive navigation apparatuses, automotive display apparatuses, TVs, wall paper display apparatuses, signage apparatuses, game machines, notebook computers, monitors, cameras, camcorders, home appliances, etc. Also, the vibration generating module according to an embodiment of the present disclosure may be applied to organic light emitting lighting apparatuses or inorganic light emitting lighting apparatuses. When the vibration generating module according to an embodiment of the present disclosure is applied to a lighting apparatus, the vibration generating module may act as lighting and a speaker.

A display apparatus according to the present disclosure will be described below.

According to an embodiment of the present disclosure, a display apparatus includes a display module including a display panel configured to display an image, a panel guide configured to support a rear periphery portion of the display panel, a rear cover configured to support the panel guide and to cover a rear surface of the display module, a first vibration generating module in a first portion of the rear cover, the first vibration generating module being configured to vibrate a center portion of the display panel, and a second vibration generating module in a second portion of the rear cover, the second vibration generating module being configured to vibrate a periphery portion of the display panel.

For example, in the display apparatus according to an embodiment of the present disclosure, the first portion of the rear cover may be spaced apart from the rear surface of the display module, and the second portion of the rear cover may contact the rear surface of the display module.

For example, the display apparatus according to an embodiment of the present disclosure may further include a sound generator between the rear surface of the display panel and the first portion of the rear cover.

For example, in the display apparatus according to an embodiment of the present disclosure, the rear cover may include a rear cover part including the first portion and the second portion and a side cover part in a periphery of the rear cover part and configured to support the panel guide.

For example, in the display apparatus according to an embodiment of the present disclosure, the panel guide may include a panel supporting part connected to the rear periphery portion of the display panel and supported by the side cover part and a guide sidewall connected to the panel supporting part to surround a side surface of the side cover part, and a vibration of the second vibration generating module may be transferred to the periphery portion of the display panel through the second portion of the rear cover part, the side cover part, and the panel supporting part.

For example, in the display apparatus according to an embodiment of the present disclosure, the rear cover part may include a first rear cover part overlapping the center portion of the display panel and including the first portion protruding toward a rear surface of the display panel and a second rear cover part overlapping the periphery portion of the display panel and including the second portion.

For example, in the display apparatus according to an embodiment of the present disclosure, the first portion of the first rear cover part may include a first rear protrusion portion protruding toward the rear surface of the display panel to overlap a left region of the center portion of the display panel and a second rear protrusion portion protruding toward the rear surface of the display panel to overlap a right region of the center portion of the display panel.

For example, in the display apparatus according to an embodiment of the present disclosure, the rear cover may further include a reinforcement part between the second rear cover part and the side cover part and surrounding the second rear cover part For example, in the display apparatus according to an embodiment of the present disclosure, the display module may further include a backlight between the rear cover part and the display panel, the backlight may include a reflective sheet on the first and second rear cover parts of the rear cover part, a light guide plate on the reflective sheet, and a plurality of optical sheets on the light guide plate, and a vibration of the second vibration generating module may be transferred to the periphery portion of the display panel through the second rear cover part, the side cover part, and the panel supporting part.

For example, in the display apparatus according to an embodiment of the present disclosure, the panel guide may be connected to the rear periphery portion of the display panel using a panel connection member.

For example, in the display apparatus according to an embodiment of the present disclosure, the first vibration generating module may include a module frame in the first portion of the rear cover, a bobbin on the module frame and connected to the first portion of the rear cover, a magnet member inside or outside the bobbin, and a coil wound around the bobbin.

For example, in the display apparatus according to an embodiment of the present disclosure, the first vibration generating module may further include a bobbin protection member between an upper portion of the bobbin and the first portion of the rear cover.

For example, in the display apparatus according to an embodiment of the present disclosure, the first vibration generating module may further include a center pole on the magnet member and a damper between the module frame and the bobbin.

For example, in the display apparatus according to an embodiment of the present disclosure, the second vibration generating module may include a piezoelectric vibrator in the second portion of the rear cover, the piezoelectric vibrator including a piezoelectric material layer.

For example, in the display apparatus according to an embodiment of the present disclosure, the second vibration generating module may further include a protection member in the piezoelectric vibrator.

For example, in the display apparatus according to an embodiment of the present disclosure, the display panel may be bent in a curved shape.

According to an embodiment of the present disclosure, a display apparatus includes a display module including a display panel configured to display an image, a panel guide configured to support a rear periphery portion of the display panel, a rear cover configured to support the panel guide and to cover a rear surface of the display module, a first vibration generating module in a first portion of the rear cover, the first vibration generating module being configured to generate sound of a first sound band in a center portion of the display panel, and a second vibration generating module in a second portion of the rear cover, the second vibration generating module being configured to generate sound of a second sound band differing from the first sound band in a periphery portion of the display panel.

For example, in the display apparatus according to an embodiment of the present disclosure, the first sound band may be lower than the second sound band.

For example, in the display apparatus according to an embodiment of the present disclosure, the rear cover may include a first rear cover part including the first portion overlapping a portion, other than a periphery portion, of the display panel and a second rear cover part including the second portion overlapping the panel guide, the first vibration generating module may be configured to vibrate the first rear cover part of the rear cover, and the second vibration generating module may be configured to vibrate the second rear cover part of the rear cover.

According to an embodiment of the present disclosure, a display apparatus includes a display module including a display panel configured to display an image, a panel guide configured to support a rear periphery portion of the display panel, a rear cover configured to support the panel guide and including a first portion overlapping a center portion, other than a periphery portion, of the display panel and a second portion overlapping the panel guide, a first vibration generating module in the first portion of the rear cover, the first vibration generating module being configured to generate a sound pressure between the center portion of the display panel and the first portion of the rear cover, and a second vibration generating module in the second portion of the rear cover, the second vibration generating module being configured to provide a sound vibration to the periphery portion of the display panel through the second portion of the rear cover.

For example, the display apparatus according to an embodiment of the present disclosure may further include a sound pressure generator between a rear surface of the display module and the first portion of the rear cover, and the second portion of the rear cover may contact the rear surface of the display module.

For example, in the display apparatus according to an embodiment of the present disclosure, the rear cover may include a rear cover part including the first portion and the second portion and a side cover part in a periphery of the rear cover part and configured to support the panel guide, and a vibration of the second vibration generating module may be transferred to the periphery portion of the display panel through the second portion of the rear cover part, the side cover part, and the panel guide.

For example, in the display apparatus according to an embodiment of the present disclosure, the panel guide may be connected to a rear periphery portion of the display panel using a panel connection member.

For example, in the display apparatus according to an embodiment of the present disclosure, the panel connection member may include an adhesive member.

For example, in the display apparatus according to an embodiment of the present disclosure, the panel connection member may be provided in a four-side-closed shape or a closed loop shape in the panel supporting part of the panel guide.

It will be apparent to those skilled in the art that various modifications and variations may be made in the display apparatus of the present disclosure without departing from the technical idea or scope of the disclosure. Thus, it is intended that embodiments of the present disclosure cover the modifications and variations of the disclosure provided they come within the scope of the appended claims and their equivalents.

What is claimed is:
1. A display apparatus, comprising:
 a display module including a display panel configured to display an image;
 a panel guide configured to support a rear periphery portion of the display panel;
 a rear cover configured to:
  support the panel guide; and
  cover a rear surface of the display module;
 a first vibration generating module in a first portion of the rear cover, the first vibration generating module being configured to vibrate a center portion of the display panel;
 a second vibration generating module in a second portion of the rear cover, the second vibration generating module being configured to vibrate a periphery portion of the display panel; and
 a system rear cover surrounding side and rear surfaces of the display module, the panel guide, the rear cover, the first vibration generating module, and the second vibration generating module, wherein the first vibration generating module and the second vibration generating module are on a rear surface of the rear cover.

2. The display apparatus of claim 1, wherein:
the first portion of the rear cover is spaced apart from the rear surface of the display module; and
the second portion of the rear cover contacts the rear surface of the display module.

3. The display apparatus of claim 1, further comprising a sound generator between the rear surface of the display panel and the first portion of the rear cover.

4. The display apparatus of claim 1, wherein the rear cover comprises:
a rear cover part including the first portion and the second portion; and
a side cover part in a periphery of the rear cover part, the side cover part being configured to support the panel guide.

5. The display apparatus of claim 4, wherein:
the panel guide comprises:
a panel supporting part connected to the rear periphery portion of the display panel, the panel supporting part being supported by the side cover part; and
a guide sidewall connected to the panel supporting part to surround a side surface of the side cover part; and
a vibration of the second vibration generating module is transferred to the periphery portion of the display panel through the second portion of the rear cover part, the side cover part, and the panel supporting part.

6. The display apparatus of claim 4, wherein the rear cover part comprises:
a first rear cover part overlapping the center portion of the display panel, the first rear cover part including the first portion protruding toward a rear surface of the display panel; and
a second rear cover part overlapping the periphery portion of the display panel, the second rear cover part including the second portion.

7. The display apparatus of claim 6, wherein the first portion of the first rear cover part includes:
a first rear protrusion portion protruding toward the rear surface of the display panel to overlap a left region of the center portion of the display panel; and
a second rear protrusion portion protruding toward the rear surface of the display panel to overlap a right region of the center portion of the display panel.

8. The display apparatus of claim 6, wherein the rear cover further comprises a reinforcement part between the second rear cover part and the side cover part, the rear cover surrounding the second rear cover part.

9. The display apparatus of claim 6, wherein:
the display module further comprises a backlight between the rear cover part and the display panel;
the backlight comprises:
a reflective sheet on the first and second rear cover parts of the rear cover part;
a light guide plate on the reflective sheet; and
a plurality of optical sheets on the light guide plate; and
a vibration of the second vibration generating module is transferred to the periphery portion of the display panel through the second rear cover part, the side cover part, and the panel supporting part.

10. The display apparatus of claim 1, wherein the panel guide is connected to the rear periphery portion of the display panel using a panel connection member.

11. The display apparatus of claim 1, wherein the first vibration generating module comprises:

a module frame in the first portion of the rear cover;
a bobbin on the module frame, the bobbin being connected to the first portion of the rear cover;
a magnet member inside or outside the bobbin; and
a coil wound around the bobbin.

12. The display apparatus of claim 11, wherein the first vibration generating module further comprises a bobbin protection member between an upper portion of the bobbin and the first portion of the rear cover.

13. The display apparatus of claim 11, wherein the first vibration generating module further comprises:
a center pole on the magnet member; and
a damper between the module frame and the bobbin.

14. The display apparatus of claim 1, wherein the second vibration generating module comprises a piezoelectric vibrator in the second portion of the rear cover, the piezoelectric vibrator including a piezoelectric material layer.

15. The display apparatus of claim 14, wherein the second vibration generating module further comprises a protection member in the piezoelectric vibrator.

16. The display apparatus of claim 1, wherein the display panel is bent in a curved shape.

17. A display apparatus, comprising:
a display module including a display panel configured to display an image;
a panel guide configured to support a rear periphery portion of the display panel;
a rear cover configured to:
support the panel guide; and
cover a rear surface of the display module;
a first vibration generating module in a first portion of the rear cover, the first vibration generating module being configured to generate sound of a first sound band in a center portion of the display panel; and
a second vibration generating module in a second portion of the rear cover, the second vibration generating module configured to generate sound of a second sound band differing from the first sound band in a periphery portion of the display panel; and
a system rear cover surrounding side and rear surfaces of the display module, the panel guide, the rear cover, the first vibration generating module, and the second vibration generating module,
wherein the first vibration generating module and the second vibration generating module are on a rear surface of the rear cover.

18. The display apparatus of claim 17, wherein the first sound band is lower than the second sound band.

19. The display apparatus of claim 17, wherein:
the rear cover comprises:
a first rear cover part including the first portion overlapping a portion, other than a periphery portion of the display panel; and
a second rear cover part including the second portion overlapping the panel guide,
the first vibration generating module is configured to vibrate the first rear cover part of the rear cover, and
the second vibration generating module is configured to vibrate the second rear cover part of the rear cover.

20. A display apparatus, comprising:
a display module including a display panel configured to display an image;
a panel guide configured to support a rear periphery portion of the display panel;
a rear cover configured to support the panel guide, the rear cover including:

a first portion overlapping a center portion, other than a periphery portion of the display panel; and
a second portion overlapping the panel guide;
a first vibration generating module in the first portion of the rear cover, the first vibration generating module being configured to generate a sound pressure between the center portion of the display panel and the first portion of the rear cover; and
a second vibration generating module in the second portion of the rear cover, the second vibration generating module being configured to provide a sound vibration to the periphery portion of the display panel through the second portion of the rear cover; and
a system rear cover surrounding side and rear surfaces of the display module, the panel guide, the rear cover, the first vibration generating module, and the second vibration generating module,
wherein the first vibration generating module and the second vibration generating module are on a rear surface of the rear cover.

21. The display apparatus of claim 20, further comprising:
a sound pressure generator between a rear surface of the display module and the first portion of the rear cover, wherein the second portion of the rear cover contacts the rear surface of the display module.

22. The display apparatus of claim 20, wherein:
the rear cover comprises:
a rear cover part including the first portion and the second portion; and
a side cover part in a periphery of the rear cover part, the side cover part being configured to support the panel guide; and
a vibration of the second vibration generating module is transferred to the periphery portion of the display panel through the second portion of the rear cover part, the side cover part, and the panel guide.

23. The display apparatus of claim 20, wherein the panel guide is connected to a rear periphery portion of the display panel using a panel connection member.

24. The display apparatus of claim 23, wherein the panel connection member comprises an adhesive member.

25. The display apparatus of claim 23, wherein the panel connection member is provided in a four-side-closed shape or a closed loop shape in the panel supporting part of the panel guide.

* * * * *